(12) United States Patent
Buchanan

(10) Patent No.: US 9,069,576 B2
(45) Date of Patent: Jun. 30, 2015

(54) NESTABLE SYSTEM AND METHOD FOR ACCESSING, ORGANIZING, AND INTERACTING WITH VISUAL REPRESENTATIONS OF DATA

(76) Inventor: Michael G. Buchanan, O'Fallon, MO (US)

(*) Notice: Subject to any disclaimer, the term of this patent is extended or adjusted under 35 U.S.C. 154(b) by 1349 days.

(21) Appl. No.: 12/449,560

(22) PCT Filed: Feb. 13, 2008

(86) PCT No.: PCT/US2008/001859
§ 371 (c)(1),
(2), (4) Date: Aug. 13, 2009

(87) PCT Pub. No.: WO2008/100516
PCT Pub. Date: Aug. 21, 2008

(65) Prior Publication Data
US 2010/0100852 A1    Apr. 22, 2010

Related U.S. Application Data

(60) Provisional application No. 60/901,489, filed on Feb. 13, 2007.

(51) Int. Cl.
| | |
|---|---|
| G06F 15/00 | (2006.01) |
| G06F 13/00 | (2006.01) |
| G06F 9/44 | (2006.01) |
| G06F 17/30 | (2006.01) |

(52) U.S. Cl.
CPC ........ *G06F 9/4443* (2013.01); *G06F 17/30554* (2013.01)

(58) Field of Classification Search
CPC .......................... G06F 9/4443; G06F 17/30554
USPC ......... 715/236, 751–753, 762–765, 741–744, 715/771, 718
See application file for complete search history.

(56) References Cited

U.S. PATENT DOCUMENTS

| | | |
|---|---|---|
| 5,388,196 A | 2/1995 | Pajak et al. |
| 5,986,657 A | 11/1999 | Berteig et al. |
| 6,005,578 A | 12/1999 | Cole |
| 6,046,739 A | 4/2000 | MacPhail |
| 6,104,395 A | 8/2000 | Alimpich et al. |
| 6,243,093 B1 * | 6/2001 | Czerwinski et al. .......... 715/848 |
| 6,252,597 B1 | 6/2001 | Lokuge |
| 6,304,259 B1 | 10/2001 | DeStefano |
| 6,426,761 B1 | 7/2002 | Kanevsky et al. |
| 6,633,316 B1 | 10/2003 | Maddalozzo, Jr. et al. |
| 6,683,633 B2 | 1/2004 | Holtzblatt et al. |
| 6,781,609 B1 | 8/2004 | Barker et al. |
| 6,820,111 B1 | 11/2004 | Rubin et al. |
| 6,829,615 B2 | 12/2004 | Schirmer et al. |
| 6,966,038 B1 | 11/2005 | Shaver et al. |
| 7,203,910 B1 | 4/2007 | Hugh et al. |
| 7,219,305 B2 | 5/2007 | Jennings |

(Continued)

*Primary Examiner* — Kevin Nguyen
(74) *Attorney, Agent, or Firm* — Daniel Klotzer; Klotzer Patents LLC

(57) ABSTRACT

The present invention includes systems of, methods for, and computer implemented products that present a nestable user interface for viewing and interacting with information displayed on a computer (or computing device) display. The nestable user interface allows a user to flexibly configure and associate information sources, both local and accessed over a network, and to seek various documents to view intuitively and by immediate visual recognition. The nestable user interface is also extensible.

60 Claims, 14 Drawing Sheets

(56) References Cited

U.S. PATENT DOCUMENTS

| | | | |
|---|---|---|---|
| 7,558,853 B2* | 7/2009 | Alcorn et al. | 709/225 |
| 7,730,395 B2* | 6/2010 | Imielinski et al. | 715/236 |
| 7,908,602 B2* | 3/2011 | Alcorn et al. | 717/174 |
| 8,001,157 B2* | 8/2011 | Bier | 707/802 |
| 8,601,373 B1* | 12/2013 | Ackley et al. | 715/718 |
| 2002/0054114 A1 | 5/2002 | Shuping et al. | |
| 2003/0097640 A1* | 5/2003 | Abrams et al. | 715/530 |
| 2003/0144868 A1* | 7/2003 | MacIntyre et al. | 705/1 |
| 2006/0101353 A1 | 5/2006 | Clark et al. | |
| 2006/0123361 A1 | 6/2006 | Sorin et al. | |
| 2007/0061745 A1 | 3/2007 | Anthony et al. | |
| 2007/0271263 A1* | 11/2007 | Merrild | 707/6 |
| 2008/0034317 A1 | 2/2008 | Fard et al. | |
| 2008/0288306 A1* | 11/2008 | MacIntyre et al. | 705/7 |
| 2009/0300532 A1* | 12/2009 | Cowan | 715/771 |
| 2010/0199198 A1* | 8/2010 | Relyea | 715/762 |

\* cited by examiner

NESTABLE SYSTEM AND METHOD FOR ACCESSING, ORGANIZING, AND INTERACTING WITH VISUAL REPRESENTATIONS OF DATA

CROSS-REFERENCE TO RELATED APPLICATIONS

The present PCT application claims priority from the co-pending U.S. provisional patent application No. 60/901,489, filed on Feb. 13, 2007, which is hereby incorporated by reference.

STATEMENT REGARDING FEDERALLY SPONSORED RESEARCH OR DEVELOPMENT

Not applicable.

BACKGROUND OF THE INVENTION

1. Field of the Invention

The present invention relates generally to accessing, organizing, and/or interacting with information, and more specifically to systems, methods, and computer implemented products for providing nestable user interfaces that enable extensible capabilities for accessing, organizing, and/or interacting with visual representation of data on a computer display.

2. Related Art

As information technology (IT) has become an ubiquitous facet of modern life, new challenges arise. In prior eras, merely gaining access to information has been a principal factor that has influenced many individuals' and organizations' capabilities. At various times, the mere possession of information has been a major avenue to the acquisition of power. Currently, and in particular with the ever increasing capacity and reach of large volume data transfer capabilities, it is not so much the naked access to information that is as critical as is the ability to organize and manage the glut of raw information that is available. Locating the appropriate information from amongst the vast breadth available has become so difficult, and the addressing of this issue has concomitantly become so valuable that great wealth has been earned purely from presenting the best present means to effect a search on the Internet. Additionally, as IT has assumed a paramount role in many IT user activities, these users' personal data storage has also become so convoluted that tools are needed to more effectively organize this personal data. The prevalent present approaches are primarily based on paradigms that model storage systems from previous eras, such as file cabinets. Many current user interface designs organize items in a file type architecture, where items reside in locations based on type of file or software used to manipulate it. Examples of these include conventional email inboxes, contacts folders, "My Documents" folders, "My Video" folders, shared network resources, and browser favorites. These paradigms are of some benefit, but also have substantial limitations due to their inability to provide substantially variable organization configuration capabilities, and their involved structures that can greatly slow locating and/or compiling diverse forms of information.

Primarily, the software tools that have been previously made available for users to access, organize, and/or interact with the panoply of information sources have been designed by software engineers who are focused on accomplishing new functionalities and advances in software design from the perspective of a designer, not a user. While this trend has been at least partially reversed in recent years, the legacy of many prior IT design choices have become as ingrained into the common user's experience as has the qwerty keyboard layout design, irrespective of the concomitant compromises or design flaws inherent within these legacy technologies. Advances in technology, from improvements in processing capabilities to advances in communication pipeline bandwidth capacities, have both provided new functionalities as well as established new problems. Advances in software design have generally focused on utilizing to the fullest extent the potentials of these new capabilities, to the point where advances in hardware performance have been balanced (or surpassed) by advances in software technical demands. Hence, the user experience often does not improve, or may even degrade even with the expansions in potential functionalities, since the learning required to fully capitalize on these advances is frequently a greater obstacle than the absence of these functionalities. Rarely are the ease and intuitiveness of use of the IT tool considered to be a first priority of the designer, except for certain notable exceptions that are celebrated successes due in particular to their focus on the user experience first and foremost.

The ever expanding bandwidths of modern communication links, and of data storage capacities also present their own opportunities and challenges. It is virtually undeniable that access to more information is an advance, and yet it is far harder to find a particular piece of information and/or organize a group of information when the pieces of information number in the millions or billions, than when they number in the hundreds or even thousands. Perception and cognition research has identified varying ways in which humans more naturally recognize and/or locate information than the standard manners in which information is generally presented and/or organized by the majority of IT resources. For example, a human will generally identify a specific item from among a large group of items more readily when that item is identified with a known image than when that item is identified with a textual label. Accordingly, it is desirable to develop software tools that will provide an IT user with more efficacious ways to access, organize, and/or interact with information.

SUMMARY OF THE INVENTION

The present invention, in its various embodiments, comprises systems for, methods of, and computer program products capable of providing a nestable user interface for accessing, organizing, presenting, and/or interacting with visual representations of data on a display. Displays able to be used in conjunction with the present invention are generally aspects of a computer system, but can also include essentially any form of display that can receive and present the appropriate visual representations of data. The present invention, also referred to as a MicroSpace, is a nestable multi-level user interface that presents a flexibly organizable, extensible workspace. A MicroSpace nestable user interface enables organizing items according to differing paradigms, such as by topic regardless of file type. Constituents of a Microspace nestable user interface can include hyperlinks, documents, podcasts, images, videos, discussions, charts, and myriad other forms of information. A MicroSpace nestable user interface according to the present invention provides a form of container for the information that populates it, but unlike a folder model, this container is more analogous to a glass box in which the user can readily ascertain the contents before the box is even opened.

The levels of a first significant embodiment of the MicroSpace nestable user interface, labeled first through fourth tiers, can also be referred to as workspace (uppermost first tier), group (lower second tier), page (still lower third tier), and component (lowermost fourth tier). The MicroSpace nestable user interface is visible in a first area of a display and has at least two primary modes, a first mode comprising at least one navigation bar and at least one first visual representation panel, and a second mode comprising at least one larger second visual representation panel and at least one constrained area breadcrumb bar that maintains a visual series of indicators of the path the user followed to and within the second mode of the MicroSpace nestable user interface. When in the first mode, the MicroSpace nestable user interface presents the navigation bar, showing a hierarchical list view of the tiered organizational structure of the contents of the MicroSpace nestable user interface, and presents within the first visual representation panel a preview of the contents of the MicroSpace nestable user interface, organized in accordance with the tiered organizational structure. The second and third tiers are effectively optional, since they can be configured to be effectively inactive, but can also provide additional manners of categorizing and arranging the contents of the MicroSpace nestable user interface, as determined by the establisher(s) and/or user(s) of a MicroSpace nestable user interface. Any of the tiers, or their contents, are addressable and accessible over a network, in accordance with various markup languages. A variety of functions provided by the MicroSpace nestable user interface enable a user or establisher to effect substantial and fundamental customization and utilization functions that allow the MicroSpace nestable user interface to be widely altered in form, content, and function as needed. In practice, a MicroSpace nestable user interface will generally be configured with an identifying background image that enables ready recognition and location of that MicroSpace nestable user interface. This background image can be of particular utility when the contents of the MicroSpace nestable user interface include additional nested MicroSpace nestable user interfaces that are displayed in compacted form in the first visual representation panel.

Among the functions available to a user when interacting with various embodiments of the MicroSpace nestable user interface are (a) viewing thumbnail images, and other compacted representations, that signify various contents of the MicroSpace nestable user interface, (b) hovering to enact previews, (c) zooming of a preview, (d) pinning, and (e) leaping. Perceiving thumbnail views are a well known aspect of virtually any user or designer IT experience. The hovering to enact previews can work in at least two manners. Hovering over a constituent of the hierarchical list view in the navigation bar invokes a preview of that constituent, and indications of its contents, in the first visual representation panel, while hovering over a content component already displayed within the first visual representation panel invokes an expanded partial detail view to arise over a fraction of the first visual representation panel. Once such an expanded partial detail view has been invoked, hovering over it will then zoom that expanded partial detail view so that it encompasses a majority of at least the first visual representation panel, and can then display a larger portion of the content component that was first hovered over. The hovering over a constituent of the hierarchical list view to invoke the preview of that constituent will generally end that preview when the hovering ends, but if that constituent is activated, for example by "clicking" on it, then the preview is pinned and thus caused to remain after the hovering has ended. When the constituent displayed in the first visual representation panel is a second nested Micro Space nestable user interface, at least one portion of its representation, often signified by a selected image, is an actable signifier that when activated, by "clicking" for example, the second MicroSpace nestable user interface, initially in the first mode, then leaps by expanding to at least encompass most of the display area occupied by the first MicroSpace nestable user interface, accompanied by the breadcrumb bar that provides compacted visual images (often images that represent the respective MicroSpace nestable user interfaces' background images) representing a path to the current view. When the leaped second MicroSpace nestable user interface also contains a nested third MicroSpace nestable user interface which is in turn leaped into, then the breadcrumb bar will display compacted visual images that represent, in order, the first, second, and third MicroSpace nestable user interfaces, respectively. Clicking on the compacted visual image of the first MicroSpace nestable user interface will return the user to the original view of the first MicroSpace nestable user interface.

Other objects and features will be in part apparent and in part pointed out hereinafter.

DETAILED DESCRIPTION OF THE PREFERRED EMBODIMENTS

In the following description, identical numbers indicate identical elements. Where an element has been described in one Figure, and is unaltered in detail or relation in any other Figure, said element description applies to all Figures.

Information technology in general, computers and computing devices, data networks accessed by computers and computing devices, and related technologies are well known and pervasively utilized aspects of modern societies. A virtually innumerable number of publications abound in the public space that describe and delineate essentially every aspect of these technologies and the fundamentals and characteristics are well known to those of ordinary skill in the art. A substantial number of patent publications also explicate these aspects including, for example, U.S. Pat. Nos. 7,219,305; 6,243,093; and 6,046,739 (in regard to FIG. 1) as well as countless others. These IT background and infrastructure basics are therefore so well known that they will not be addressed in greater detail herein, since they are understood even to those who have barely a beginners skill in the art, much less those of ordinary skill in the art.

Figure 1:
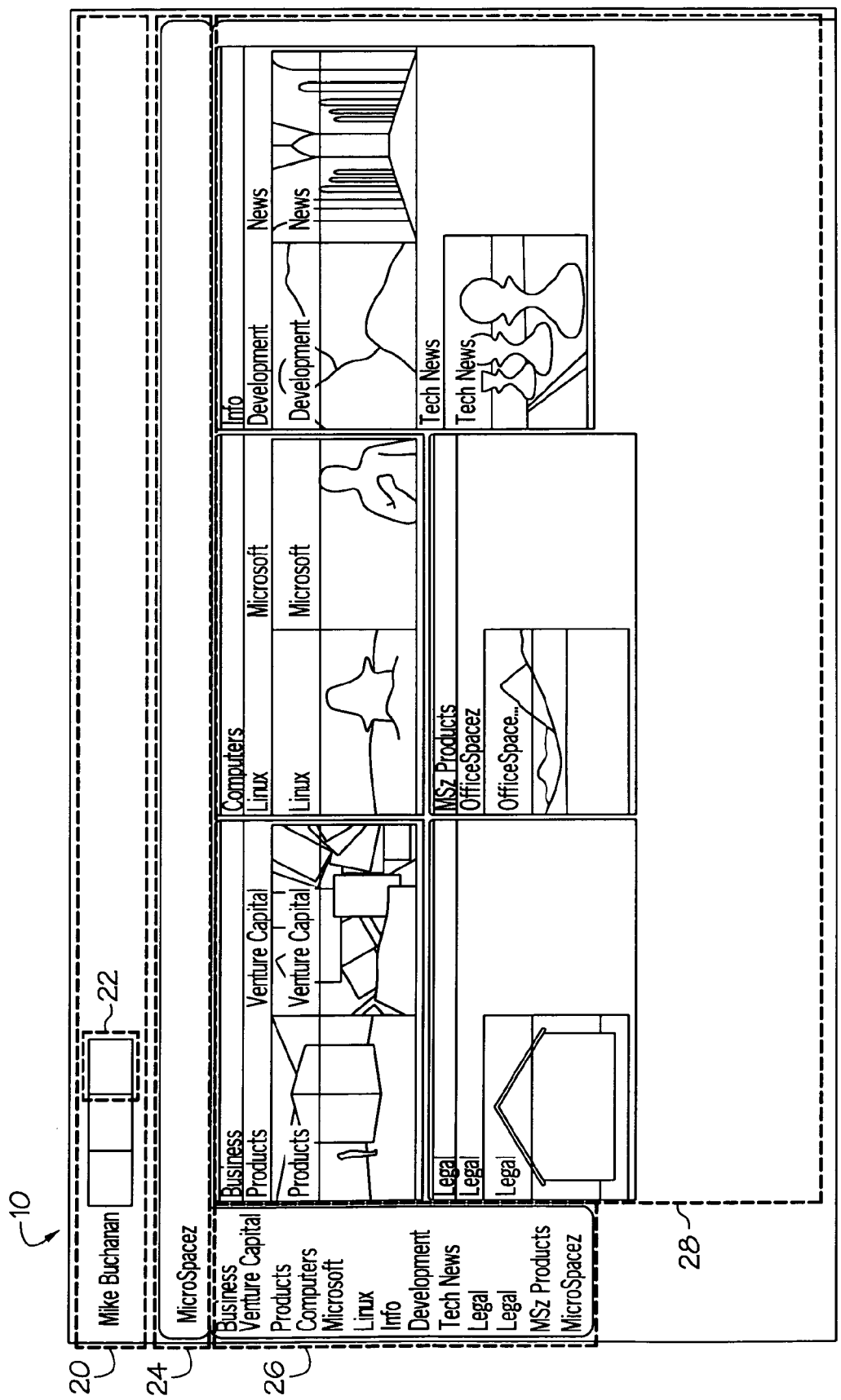
FIG. 1 is a view of a first embodiment of a nestable user interface at a workspace level showing the parts of the nestable user interface.
Figure 2:
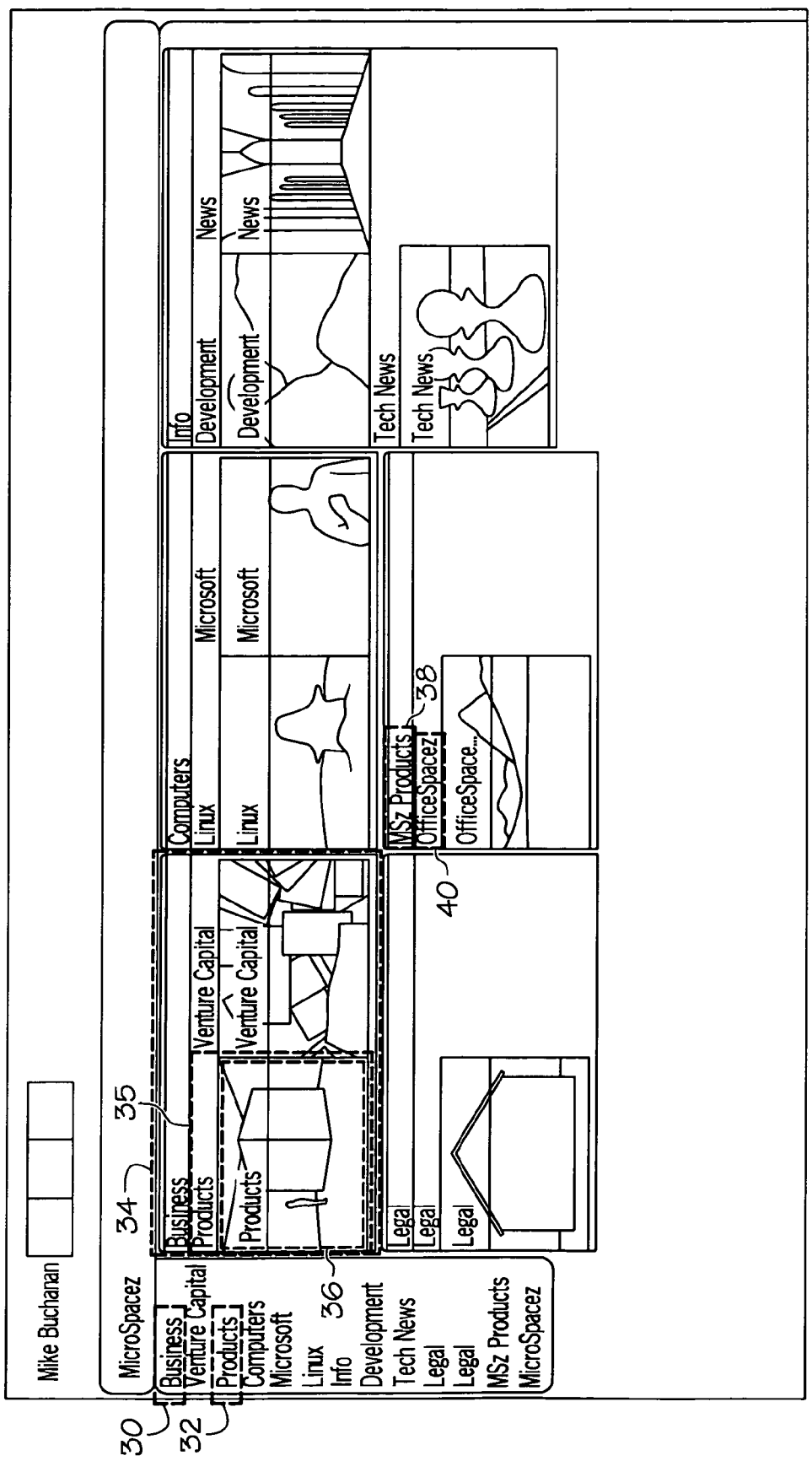
FIG. 2 is a view of a first embodiment of a nestable user interface at a workspace level showing the subparts of the nestable user interface.

The present invention is explicitly designed and implemented to be greatly malleable in its manner of use, its implementation, and in its configuration. Hence, it is important to understand that the embodiment examples described herein are illustrative examples only and are not indicative of any constraints on the range of variety of the present invention, nor are they intended to be limiting in any manner. The exemplary embodiments described herein are, however, useful to indicate and illustrate certain significant features of the present invention, and are thus presented to improve understanding of the present invention. A first significant embodiment of the present invention is shown in various states and arrangements in FIGS. 1-8, as would be seen by a user of the exemplary first embodiment. FIG. 1 shows an initial view of a first embodiment in a common first mode first state configuration 10. Said first mode first state configuration 10 presents a layout that includes a desktop bar 20 that shows thumbnail representations 22 of selected desktop level nestable user interfaces. These thumbnails 22 provide indications of, and optionally links to, the other desktop level nestable user interfaces. A title bar 24 displays the title of the presently open nestable user interface. A navigation bar 26 displays the hierarchical list view of groups 30 and pages 32, and a first visual representation panel 28 is disposed alongside the navigation bar 26. In FIG. 2, the first visual representation panel 28 is seen to contain groups 34 and pages 35, displayed in correspondence to the organizational structure of the hierarchical list view in the navigation bar 26. The groups 34 and pages 35 are identified with group headings 38 and page headings 40.

Figure 3:
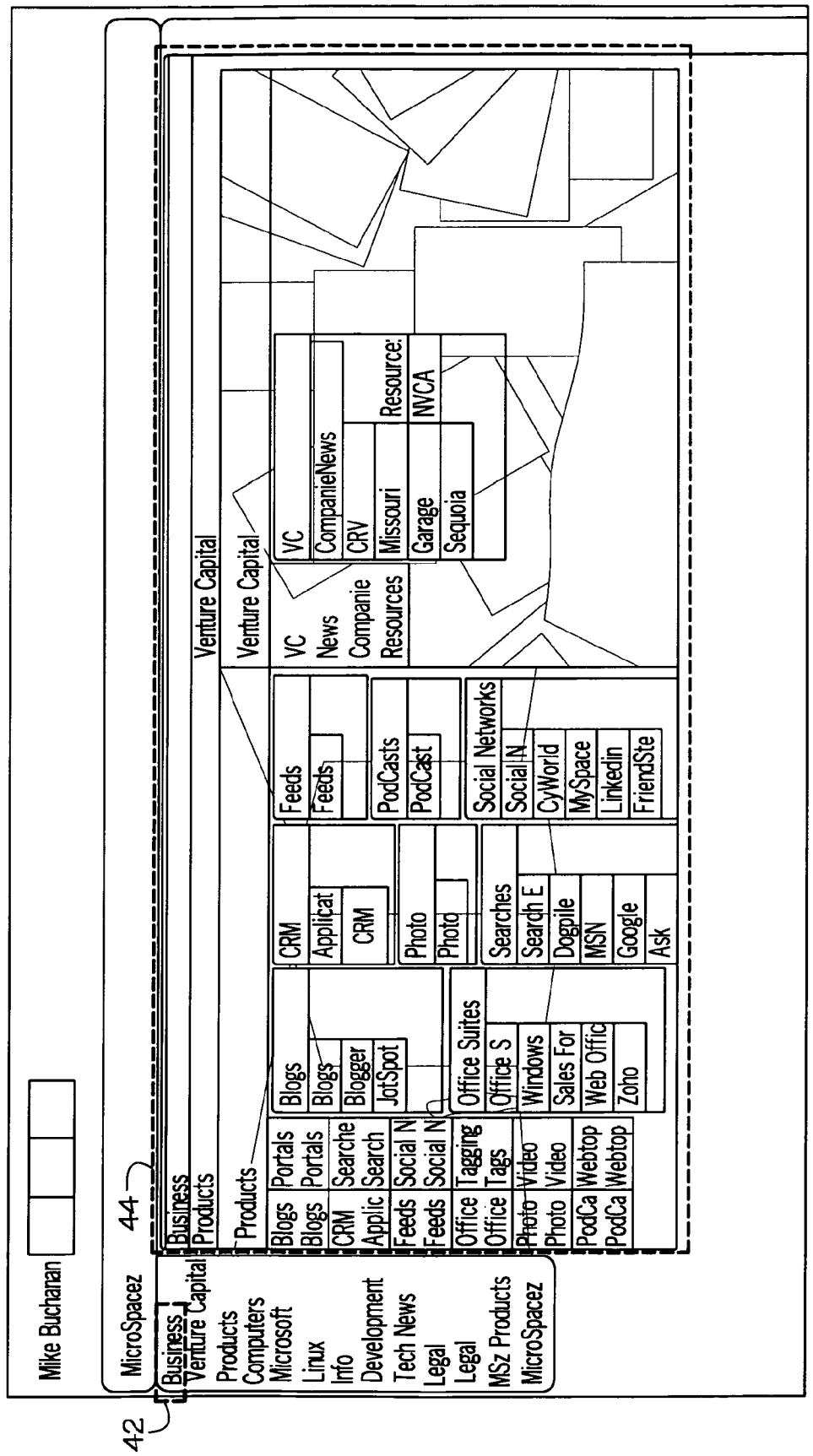
FIG. 3 is a view of a first embodiment of a nestable user interface at a group level view.
Figure 4:
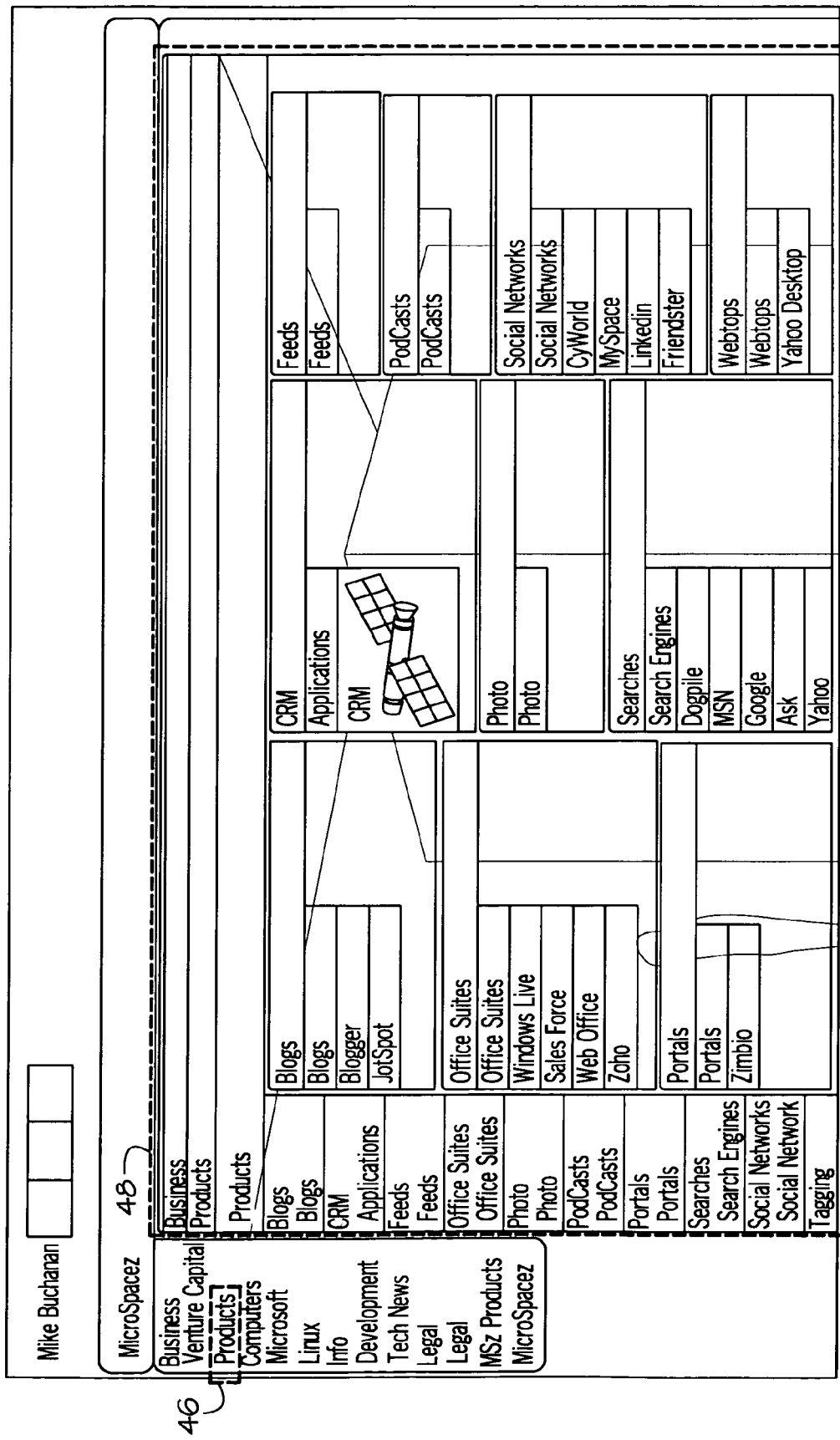
FIG. 4 is a view of a first embodiment of a nestable user interface at a page level view.
Figure 5:
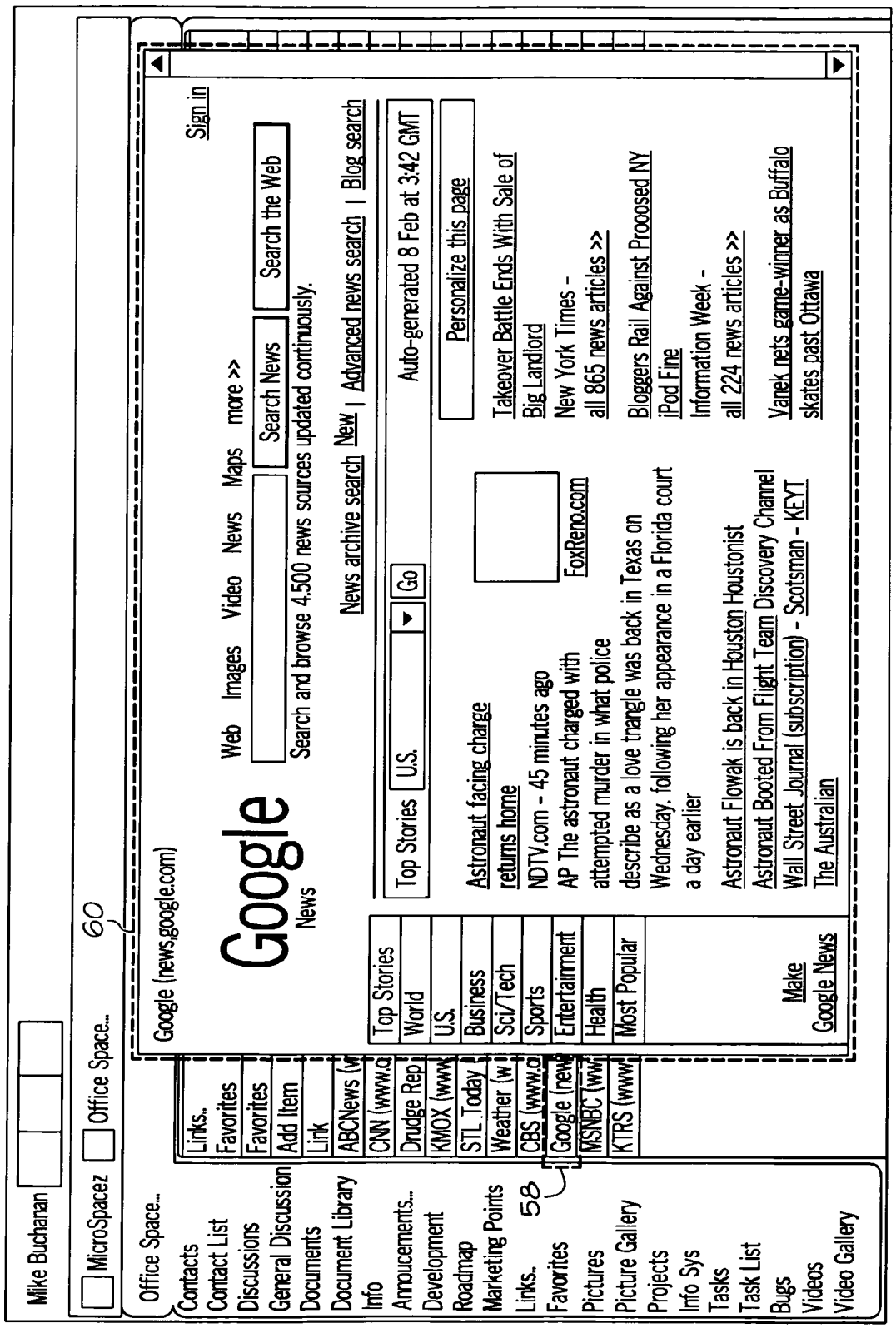
FIG. 5 is a view of a first embodiment of a nestable user interface showing sample interaction with a component.

As seen in FIGS. 3 and 4, various actions by the user will enact differing nestable user interface view events. In FIG. 3, when the title bar 24 is hovered, the title bar 24 is highlighted, and a preview of all of the groups 34, pages 35, and content components 36 are displayed (sometimes in compacted or abbreviated form, depending on the volume of content) in the view area. When a group 42 on the navigation bar 26 is hovered, the group 42 is highlighted, and a full view 44 of the group 42 is displayed in the first visual representation panel 28. As seen in FIG. 4, when a page 46 on the navigation bar 26 is hovered, the page 46 is highlighted, and a preview of all of the components 48 in the page 46 is displayed in the first visual representation panel 28. As seen in FIG. 5, when a content component 58 in the first visual representation panel 28 is hovered, it can respond by displaying additional information or an additional view 60. These action variations are dependent on the component and its nature, and is independent of the nestable user interface. A pinning action occurs when the title bar 24, group 34 or page 35 on the navigation bar 26 is clicked, it becomes pinned. Other items in the navigation bar 26 or title bar 24 can be hovered and previewed when a differing aspect is pinned, but when the mouse moves over the first visual representation panel 28, the pinned item reappears. Items can be unpinned by clicking on them again, or by pinning another item.

Figure 6:
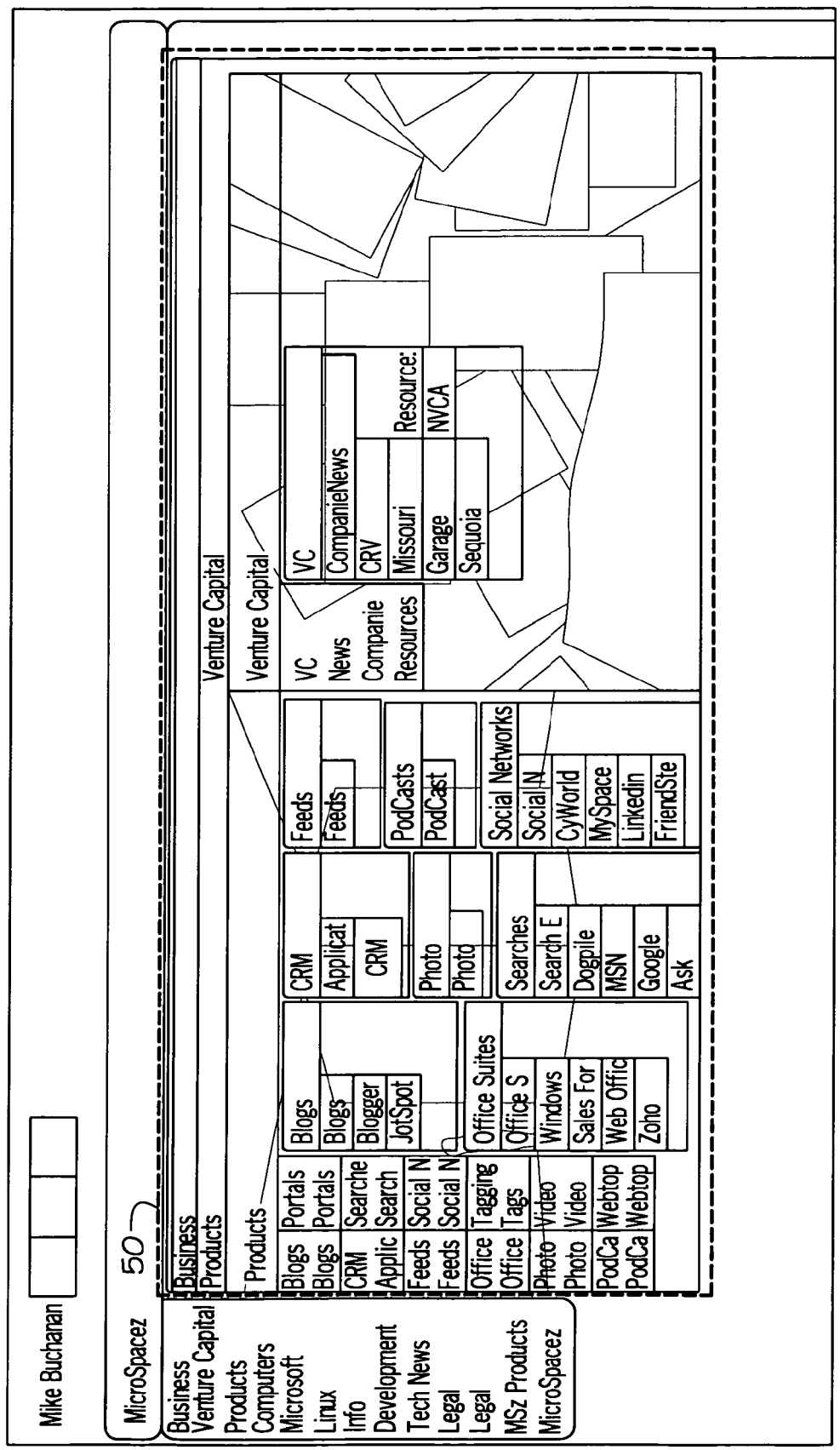
FIG. 6 is a view of a first embodiment of a nestable user interface at a group level zoom view.
Figure 7:
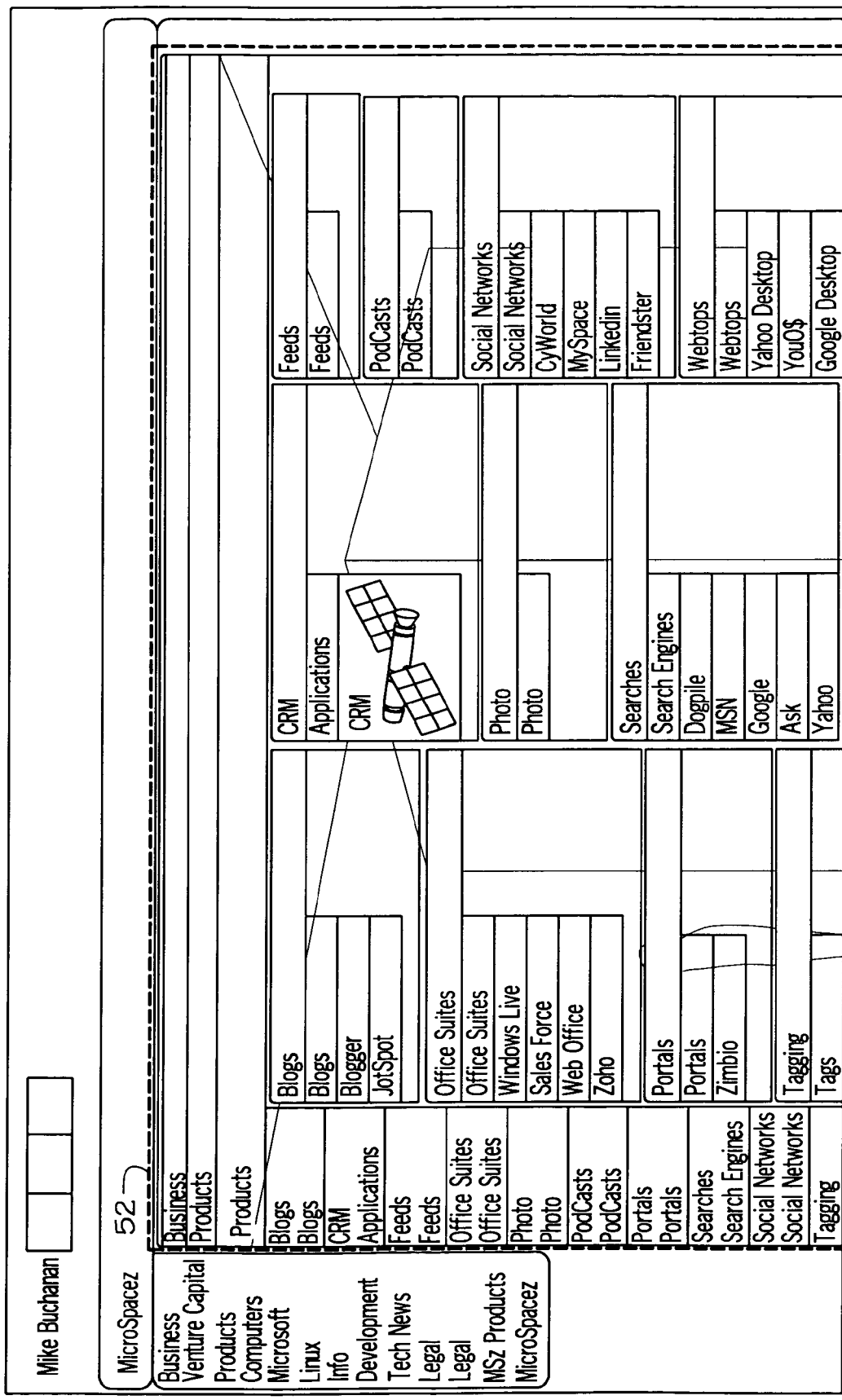
FIG. 7 is a view of a first embodiment of a nestable user interface at a page level zoom view.
Figure 8:
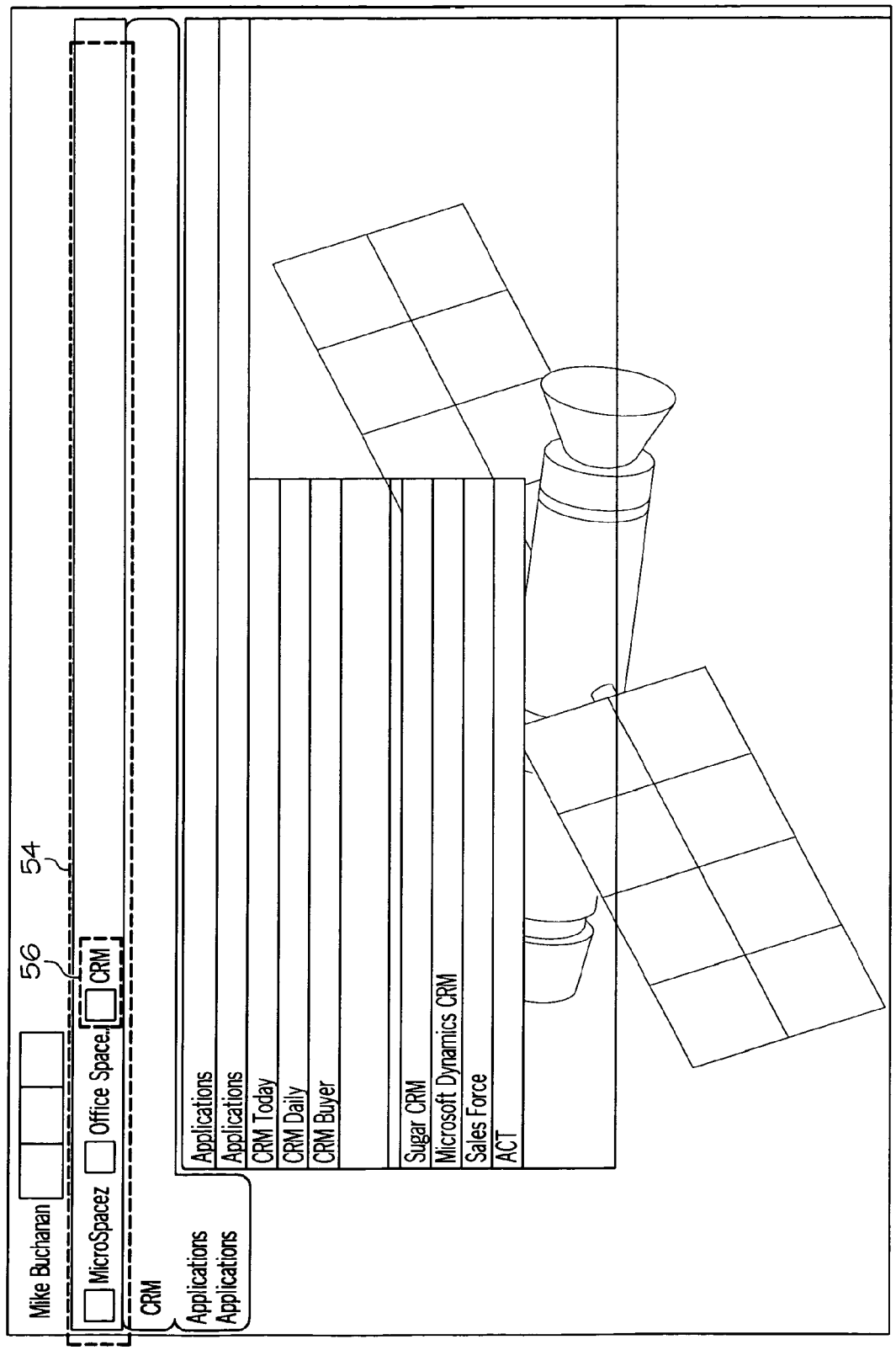
FIG. 8 is a view of a first embodiment of a nested nestable user interface that has been leaped into.

As seen in FIG. 6, when a group 50 in the first visual representation panel 28 is hovered and a scroll wheel used by the user is rolled forward, a zoom of the group 50 is brought forward and displayed, and when the scroll wheel is rolled backward, the group 50 is placed back. As seen in FIG. 7, when a page 52 in the first visual representation panel 28 is hovered and the user's scroll wheel is rolled forward, a zoom of the page is displayed, and when the user's scroll wheel is rolled backward, the page 52 is placed back. And as seen in FIG. 8, a content component 36 can be of varying natures including another nestable user interface nested within the original nestable user interface. When a content component 36 indicating another nested nestable user interface is clicked, its thumbnail 56 is added to the breadcrumb bar 54, and the previously nested nestable user interface fills the full interface area. This jump to the new nestable user interface is termed leaping. Successive leaps are added to the breadcrumb bar 54 that maintains and displays a breadcrumb trail. Hovering over any one of the thumbnails 56 then shows that thumbnail's associated nestable user interface.

Figure 9:
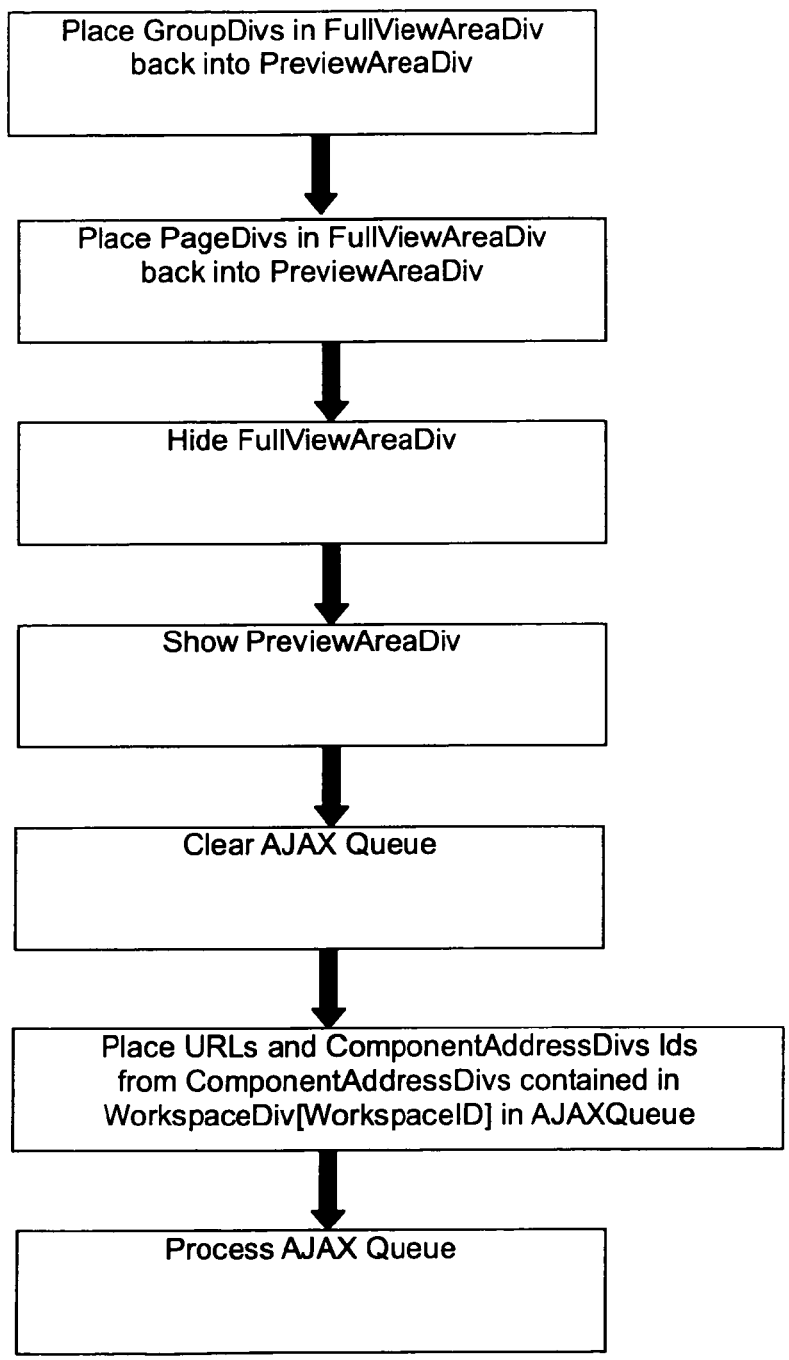
FIG. 9 is a view of a flow chart of the JavaScript® routine ShowWorkspace (WorkspaceID).
Figure 10:
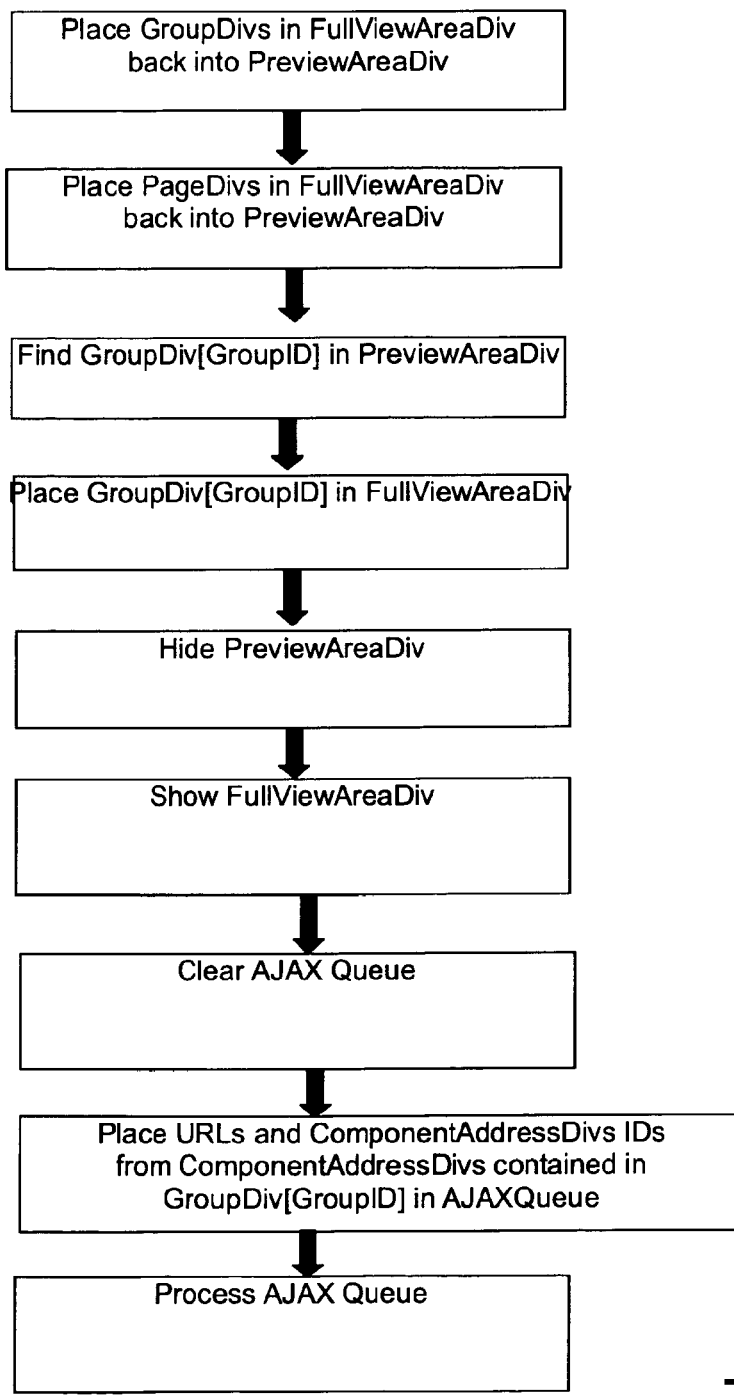
FIG. 10 is a view of a flow chart of the JavaScript® routine ShowGroup (GroupID).
Figure 11:
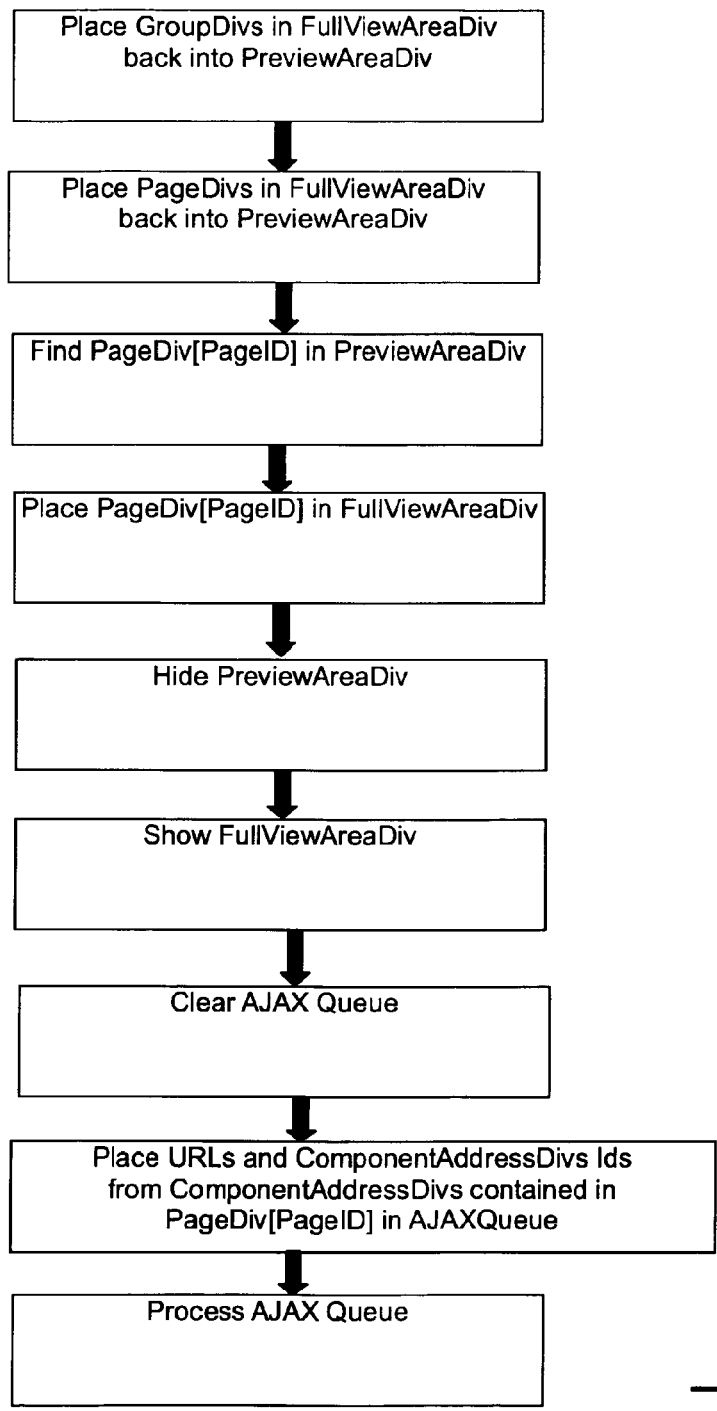
FIG. 11 is a view of a flow chart of the JavaScript® routine ShowPage (PageID).
Figure 12:
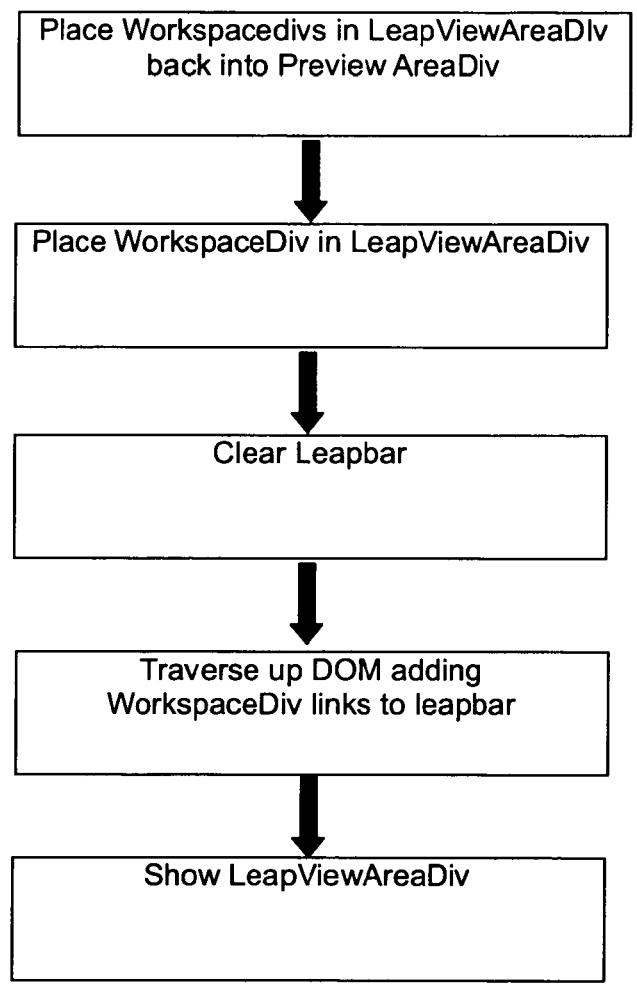
FIG. 12 is a view of a flow chart of the JavaScript® routine Leap (WorkspaceID).
Figure 13:
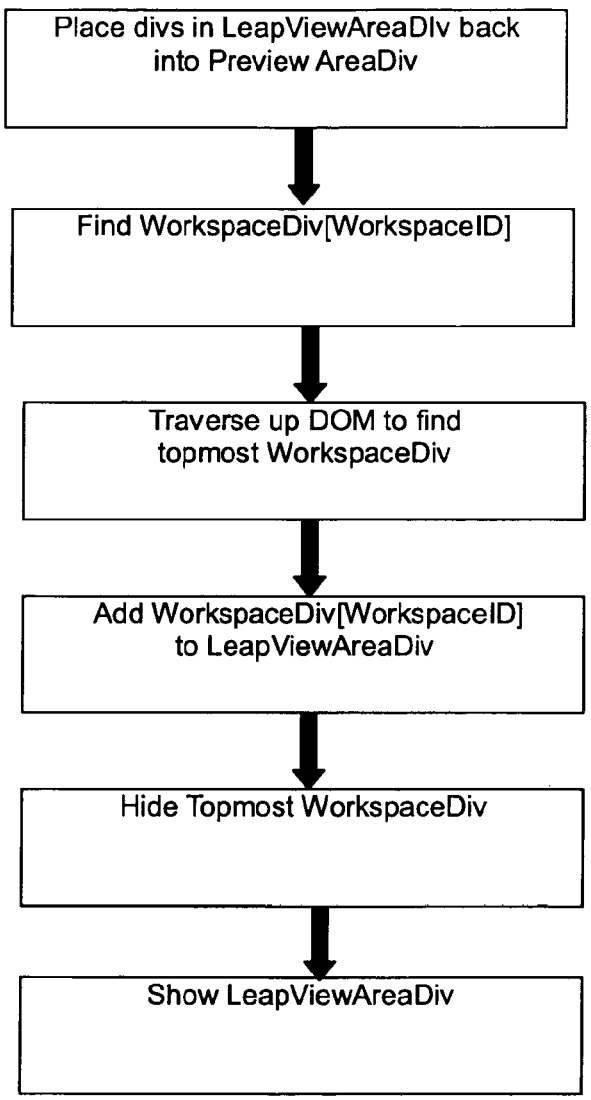
FIG. 13 is a view of a flow chart of the JavaScript® routine Leap (WorkspaceID).
Figure 14:
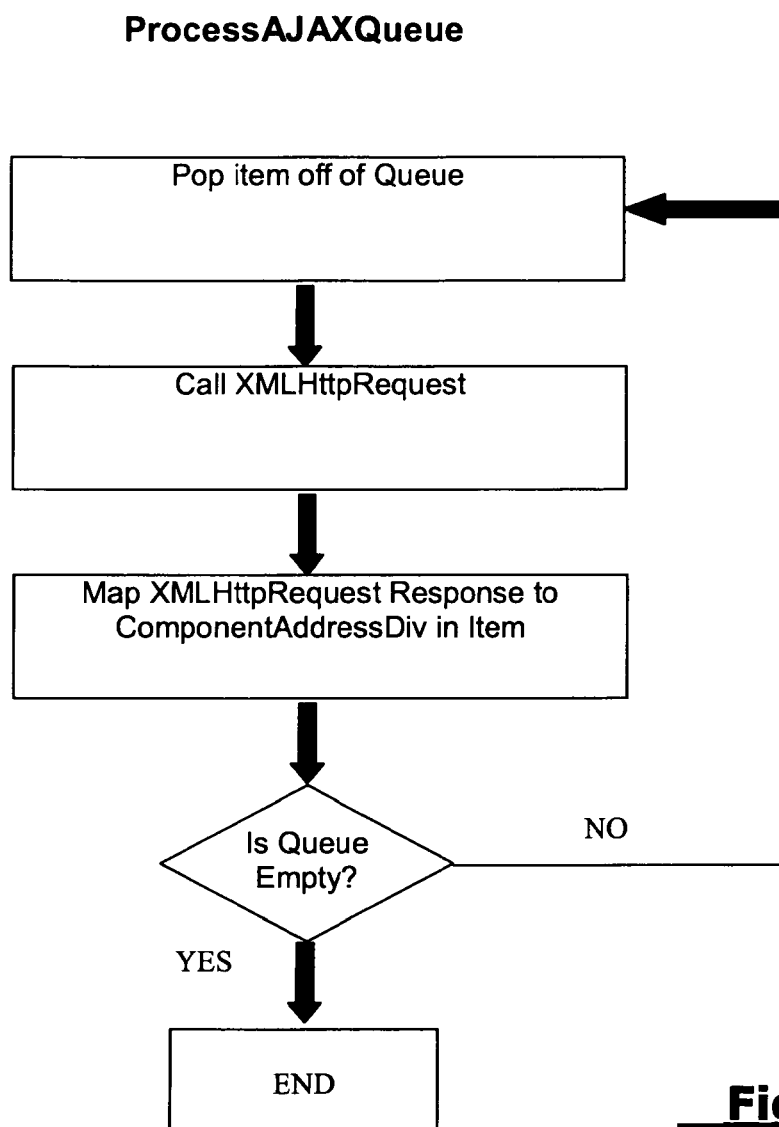
FIG. 14 is a view of a JavaScript® routine for a call to an Internet (or other network address).

FIGS. 9-14 show various JavaScript® routines that are variously implemented by the present invention to effect its various functions and actions. FIG. 9 is a flow chart of the JavaScript® routine ShowWorkspace (WorkspaceID) with the parameter identifying the particular workspace being generically illustrated as "WorkspaceID". FIG. 10 is a flow chart of the JavaScript® routine ShowGroup (GroupID) with the parameter identifying the particular group being generically illustrated as "GroupID". FIG. 11 is a flow chart of the JavaScript® routine ShowPage (PageID) with the parameter identifying the particular page being generically illustrated as "PageID". FIG. 12 is a flow chart of the JavaScript® routine Leap (WorkspaceID) invoked when the relevant active signifier (usually a thumbnail image indicating the relevant nestable user interface) is selected, generally by clicking a mouse, with the parameter identifying the particular workspace being generically illustrated as "WorkspaceID". FIG. 13 is a flow chart of the JavaScript® routine Leap (WorkspaceID) invoked when the relevant breadcrumb bar signifier (usually a thumbnail image indicating the relevant nestable user interface) is hovered over with the parameter identifying the particular workspace being generically illustrated as "WorkspaceID". FIG. 14 is a JavaScript® routine for a call to an Internet (or other network address) that returns an XML http data response. FIG. 15 depicts a representative example of html code that will produce a nestable user interface in accordance with the present invention, in a manner that is well known to those of ordinary skill in the art.

In view of the above, it will be seen that the various objects and features of the invention are achieved and other advantageous results obtained. The examples contained herein are merely illustrative and are not intended in a limiting sense.

What is claimed is:

1. A method of accessing visual representations of data, comprising:

establishing a first nestable user interface in a first area of a computing device display, said first nestable user interface having at least a first mode providing at least one navigation bar along with at least one first visual representation panel, and a second mode providing at least one larger second visual representation panel;

configuring said first nestable user interface with a tiered organizational structure encompassing at least an uppermost first tier, at least one lower optional second tier, at least one still lower optional third tier, and at least one lowermost fourth tier that accommodates at least a first association with at least a first visual representation of data such that activating said first association provides at least a partial view of said first visual representation of data in at least one portion of at least one of said first and second visual representation panels;

enabling said fourth tier to accommodate at least one second nested association with one of at least said first nestable user interface and at least one second nestable user interface such that activating said at least one second nested association provides at least a partial view of its associated second nestable user interface in at least one portion of at least one of said first and second visual representation panels; and, selectably, capacitating at least one of any of said nestable user interfaces to present at least one background image to provide a recognizable indication of said at least one of any of said nestable user interfaces.

2. The method of accessing visual representations of data according to claim 1, wherein, when the first nestable user interface is in the first mode, said navigation bar provides a hierarchical list view of the tiered organizational structure.

3. The method of accessing visual representations of data according to claim 1, wherein, when the first nestable user interface is in a first state of the first mode, said first visual representation panel provides a first preview of the contents of the data associated with the fourth tier associations, said first preview arranged in accordance with said organizational structure.

4. The method of accessing visual representations of data according to claim 2, further comprising hovering a cursor over a constituent of the navigation bar hierarchical list view to provide a first expanded view, within the first visual representation panel, of the visual representation of data associated with said navigation bar hierarchical list constituent.

5. The method of accessing visual representations of data according to claim 4, further comprising pinning said expanded first view to said first visual representation panel by clicking said constituent of the navigation bar hierarchical list view, wherein said pinning induces said expanded first view to remain within the first visual representation panel when the cursor is no longer hovering over the constituent of the navigation bar hierarchical list view.

6. The method of accessing visual representations of data according to claim 3, further comprising, when the first nestable user interface is initially in the first state of the first mode, hovering a cursor over a first constituent of the first preview to switch the first nestable user interface to a first mode second state that provides a first expanded detail partial preview, within a fractional portion of the first visual representation panel, of the visual representation of data associated with the first preview first constituent, when said first preview first constituent is associated with at least one content component, said at least one content component representing at least one datum that does not represent a nestable user interface's organizational structure.

7. The method of accessing visual representations of data according to claim 6, further comprising, when said cursor is initially hovering over said first constituent and the first nestable user interface is in the first mode second state, subsequently relocating the cursor to hovering over a part of said first expanded detail partial preview to effect switching the first nestable user interface to a first mode third state that provides a further expanded more complete view, within the first visual representation panel, of the visual representation of data associated with the first preview first constituent.

8. The method of accessing visual representations of data according to claim 3, wherein, when said first preview contents includes at least one second nestable user interface, the second nestable user interface is represented by a compacted representation, within the first preview, of the at least one second nestable user interface's uncompacted appearance.

9. The method of accessing visual representations of data according to claim 4, wherein, when said first expanded view is a visual representation of at least one second nestable user interface, said first expanded view provides accessing capabilities to visual representations of data associated with the second nestable user interface, in its first mode, that are comparable to those provided by the first nestable user interface.

10. The method of accessing visual representations of data according to claim 1, wherein any visual representation of any said at least one second nestable user interface is denotable by at least one actable signifier that is at least one of a textual label and an image, when the visual representation of said at least one second nestable user interface is viewable within at least one of said at least one first and at least one second visual representation panels; said method further comprising, leaping into said at least one second nestable user interface by activating said actable signifier, said leaping entailing the first nestable user interface assuming said second mode wherein the second visual representation panel occupies the majority of said first area and portrays said at least one second nestable user interface across its extent, and, selectably, leaping repeatedly into other nestable user interfaces, said leaping further entailing the presenting of a breadcrumb bar in a constrained portion of the first area, said breadcrumb bar providing a visual series of indicators that represent the path of nestable user interfaces traversed by said leaping to arrive at a present visual representation.

11. The method of accessing visual representations of data according to claim 1, wherein said nestable user interface is produced by utilization of a markup language.

12. The method of accessing visual representations of data according to claim 1, wherein at least one aspect of at least one of said nestable user interfaces is extensible.

13. The method of accessing visual representations of data according to claim 1, wherein at least one of said associations is at least one of local, network accessible, removable, and restrictable.

14. The method of accessing visual representations of data according to claim 1, wherein said nestable user interface functionalities are enacted by the utilization of JavaScript® routines.

15. The method of accessing visual representations of data according to claim 1, wherein the contents of the data associated with the fourth tier associations can comprise at least one of static data, dynamic data, streaming data, and applications.

16. A graphical user interface embodied on one or more non-transitory computer-readable media and executable on a computer, said graphical user interface comprising:

a first nestable user interface in a first area of a computing device display, said first nestable user interface having at least a first mode providing at least one navigation bar along with at least one first visual representation panel, and a second mode providing at least one larger second visual representation panel;

said first nestable user interface configured with a tiered organizational structure encompassing at least an uppermost first tier, at least one lower optional second tier, at least one still lower optional third tier, and at least one lowermost fourth tier that accommodates at least a first association with at least a first visual representation of data such that activating said first association provides at least a partial view of said first visual representation of data in at least one portion of at least one of said first and second visual representation panels;

said fourth tier able to accommodate at least one second nested association with one of at least said first nestable user interface and at least one second nestable user interface such that activating said at least one second nested association provides at least a partial view of its associated second nestable user interface in at least one portion of at least one of said first and second visual representation panels; and, at least one of any of said nestable user interfaces capable of presenting at least one background image is selectably configured to provide a recognizable indication of said at least one of any of said nestable user interfaces.

17. The graphical user interface embodied on one or more non-transitory computer-readable media and executable on a computer according to claim 16, wherein, when the first nestable user interface is in the first mode, said navigation bar provides a hierarchical list view of the tiered organizational structure.

18. The graphical user interface embodied on one or more non-transitory computer-readable media and executable on a computer according to claim 16, wherein, when the first nestable user interface is in a first state of the first mode, said first visual representation panel provides a first preview of the contents of the data associated with the fourth tier associations, said first preview arranged in accordance with said organizational structure.

19. The graphical user interface embodied on one or more non-transitory computer-readable media and executable on a computer according to claim 17, further providing, when hovering a cursor over a constituent of the navigation bar hierarchical list view, a first expanded view, within the first visual representation panel, of the visual representation of data associated with said navigation bar hierarchical list constituent.

20. The graphical user interface embodied on one or more non-transitory computer-readable media and executable on a computer according to claim 19, further providing, when pinning said expanded first view to said first visual representation panel by clicking said constituent of the navigation bar hierarchical list view, that said pinning induces said expanded first view to remain within the first visual representation panel when the cursor is no longer hovering over the constituent of the navigation bar hierarchical list view.

21. The graphical user interface embodied on one or more non-transitory computer-readable media and executable on a computer according to claim 18, wherein, when the first nestable user interface is initially in the first state of the first mode and a cursor is hovered over a first constituent of the first preview, the first nestable user interface switches to a first mode second state that provides a first expanded detail partial preview, within a fractional portion of the first visual representation panel, of the visual representation of data associated with the first preview first constituent, when said first preview first constituent is associated with at least one content component, said at least one content component representing at least one datum that does not represent a nestable user interface's organizational structure.

22. The graphical user interface embodied on one or more non-transitory computer-readable media and executable on a computer according to claim 21, wherein, when said cursor is initially hovering over said first constituent and the first nestable user interface is in the first mode second state, subsequently relocating the cursor to hovering over a part of said first expanded detail partial preview effects switching the first nestable user interface to a first mode third state that provides a further expanded more complete view, within the first visual representation panel, of the visual representation of data associated with the first preview first constituent.

23. The graphical user interface embodied on one or more non-transitory computer-readable media and executable on a computer according to claim 18, wherein, when said first preview contents includes at least one second nestable user interface, the second nestable user interface is represented by a compacted representation, within the first preview, of the at least one second nestable user interface's incompacted appearance.

24. The graphical user interface embodied on one or more non-transitory computer-readable media and executable on a computer according to claim 19, wherein, when said first expanded view is a visual representation of at least one second nestable user interface, said first expanded view provides accessing capabilities to visual representations of data associated with the second nestable user interface, in its first mode, that are comparable to those provided by the first nestable user interface.

25. The graphical user interface embodied on one or more non-transitory computer-readable media and executable on a computer according to claim 16, wherein any visual representation of any said at least one second nestable user interface is denotable by at least one actable signifier that is at least one of a textual label and an image, when the visual representation of said at least one second nestable user interface is viewable within at least one of said at least one first and at least one second visual representation panels; and, when leaping into said at least one second nestable user interface by activating said actable signifier, said leaping entails the first nestable user interface assuming said second mode wherein the second visual representation panel occupies the majority of said first area and portrays said at least one second nestable user interface across its extent, and said leaping further presents a selectable option of leaping repeatedly into other nestable user interfaces, said leaping further entailing the presenting of a breadcrumb bar in a constrained portion of the first area, said breadcrumb bar providing a visual series of indicators that represent the path of nestable user interfaces traversed by said leaping to arrive at a present visual representation.

26. The graphical user interface embodied on one or more non-transitory computer-readable media and executable on a computer according to claim 16, wherein said nestable user interface is produced by utilization of a markup language.

27. The graphical user interface embodied on one or more non-transitory computer-readable media and executable on a computer according to claim 16, wherein at least one aspect of at least one of said nestable user interfaces is extensible.

28. The graphical user interface embodied on one or more non-transitory computer-readable media and executable on a computer according to claim 16, wherein at least one of said associations is at least one of local, network accessible, removable, and restrictable.

29. The graphical user interface embodied on one or more non-transitory computer-readable media and executable on a computer according to claim 16, wherein said nestable user interface functionalities are enacted by the utilization of JavaScript® routines.

30. The graphical user interface embodied on one or more non-transitory computer-readable media and executable on a computer according to claim 16, wherein the contents of the data associated with the fourth tier associations can comprise at least one of static data, dynamic data, streaming data, and applications.

31. One or more non-transitory computer-readable media having computer-useable instructions embodied thereon to perform a method for presenting items to a user, said method comprising:
 establishing a first nestable user interface in a first area of a computing device display, said first nestable user interface having at least a first mode providing at least one navigation bar along with at least one first visual representation panel, and a second mode providing at least one larger second visual representation panel;
 configuring said first nestable user interface with a tiered organizational structure encompassing at least an uppermost first tier, at least one lower optional second tier, at least one still lower optional third tier, and at least one lowermost fourth tier that accommodates at least a first association with at least a first visual representation of data such that activating said first association provides at least a partial view of said first visual representation of data in at least one portion of at least one of said first and second visual representation panels;
 enabling said fourth tier to accommodate at least one second nested association with one of at least said first nestable user interface and at least one second nestable user interface such that activating said at least one second nested association provides at least a partial view of its associated second nestable user interface in at least one portion of at least one of said first and second visual representation panels; and, selectably,
 capacitating at least one of any of said nestable user interfaces to present at least one background image to provide a recognizable indication of said at least one of any of said nestable user interfaces.

32. The one or more non-transitory computer-readable media having computer-useable instructions embodied thereon to perform a method for presenting items to a user according to claim 31, wherein, when the first nestable user interface is in the first mode, said navigation bar provides a hierarchical list view of the tiered organizational structure.

33. The one or more non-transitory computer-readable media having computer-useable instructions embodied thereon to perform a method for presenting items to a user according to claim 31, wherein, when the first nestable user interface is in a first state of the first mode, said first visual representation panel provides a first preview of the contents of the data associated with the fourth tier associations, said first preview arranged in accordance with said organizational structure.

34. The one or more non-transitory computer-readable media having computer-useable instructions embodied thereon to perform a method for presenting items to a user according to claim 32, said method further comprising hovering a cursor over a constituent of the navigation bar hierarchical list view to provide a first expanded view, within the first visual representation panel, of the visual representation of data associated with said navigation bar hierarchical list constituent.

35. The one or more non-transitory computer-readable media having computer-useable instructions embodied thereon to perform a method for presenting items to a user according to claim 34, said method further comprising pinning said expanded first view to said first visual representation panel by clicking said constituent of the navigation bar hierarchical list view, wherein said pinning induces said expanded first view to remain within the first visual representation panel when the cursor is no longer hovering over the constituent of the navigation bar hierarchical list view.

36. The one or more non-transitory computer-readable media having computer-useable instructions embodied thereon to perform a method for presenting items to a user according to claim 33, said method further comprising, when the first nestable user interface is initially in the first state of the first mode, hovering a cursor over a first constituent of the first preview to switch the first nestable user interface to a first mode second state that provides a first expanded detail partial preview, within a fractional portion of the first visual representation panel, of the visual representation of data associated with the first preview first constituent, when said first preview first constituent is associated with at least one content component, said at least one content component representing at least one datum that does not represent a nestable user interface's organizational structure.

37. The one or more non-transitory computer-readable media having computer-useable instructions embodied thereon to perform a method for presenting items to a user according to claim 36, said method further comprising, when said cursor is initially hovering over said first constituent and the first nestable user interface is in the first mode second state, subsequently relocating the cursor to hovering over a part of said first expanded detail partial preview to effect switching the first nestable user interface to a first mode third state that provides a further expanded more complete view, within the first visual representation panel, of the visual representation of data associated with the first preview first constituent.

38. The one or more non-transitory computer-readable media having computer-useable instructions embodied thereon to perform a method for presenting items to a user according to claim 33, wherein, when said first preview contents includes at least one second nestable user interface, the second nestable user interface is represented by a compacted representation, within the first preview, of the at least one second nestable user interface's incompacted appearance.

39. The one or more non-transitory computer-readable media having computer-useable instructions embodied thereon to perform a method for presenting items to a user according to claim 34, wherein, when said first expanded view is a visual representation of at least one second nestable user interface, said first expanded view provides accessing capabilities to visual representations of data associated with the second nestable user interface, in its first mode, that are comparable to those provided by the first nestable user interface.

40. The one or more non-transitory computer-readable media having computer-useable instructions embodied thereon to perform a method for presenting items to a user according to claim 31, wherein any visual representation of any said at least one second nestable user interface is denotable by at least one actable signifier that is at least one of a textual label and an image, when the visual representation of said at least one second nestable user interface is viewable within at least one of said at least one first and at least one second visual representation panels; said method further comprising,
 leaping into said at least one second nestable user interface by activating said actable signifier, said leaping entailing the first nestable user interface assuming said second mode wherein the second visual representation panel occupies the majority of said first area and portrays said at least one second nestable user interface across its extent, and presenting one or more selectable options of leaping repeatedly into other nestable user interfaces, said leaping further entailing the presenting of a breadcrumb bar in a constrained portion of the first area, said breadcrumb bar providing a visual series of indicators that represent the path of nestable user interfaces traversed by said leaping to arrive at a present visual representation.

41. The one or more non-transitory computer-readable media having computer-useable instructions embodied thereon to perform a method for presenting items to a user according to claim 31, wherein said nestable user interface is produced by utilization of a markup language.

42. The one or more computer-readable media having computer-useable instructions embodied thereon to perform a method for presenting items to a user according to claim 31, wherein at least one aspect of at least one of said nestable user interfaces is extensible.

43. The one or more non-transitory computer-readable media having computer-useable instructions embodied thereon to perform a method for presenting items to a user according to claim 31, wherein at least one of said associations is at least one of local, network accessible, removable, and restrictable.

44. The one or more non-transitory computer-readable media having computer-useable instructions embodied thereon to perform a method for presenting items to a user according to claim 31, wherein said nestable user interface functionalities are enacted by the utilization of JavaScript® routines.

45. The one or more non-transitory computer-readable media having computer-useable instructions embodied thereon to perform a method for presenting items to a user according to claim 31, wherein the contents of the data associated with the fourth tier associations can comprise at least one of static data, dynamic data, streaming data, and applications.

46. A computer system for presenting items to a user, the system comprising:
a first nestable user interface in a first area of a computing device display, said first nestable user interface having at least a first mode providing at least one navigation bar along with at least one first visual representation panel, and a second mode providing at least one larger second visual representation panel;
said first nestable user interface configured with a tiered organizational structure encompassing at least an uppermost first tier, at least one lower optional second tier, at least one still lower optional third tier, and at least one lowermost fourth tier that accommodates at least a first association with at least a first visual representation of data such that activating said first association provides at least a partial view of said first visual representation of data in at least one portion of at least one of said first and second visual representation panels;
said fourth tier able to accommodate at least one second nested association with one of at least said first nestable user interface and at least one second nestable user interface such that activating said at least one second nested association provides at least a partial view of its associated second nestable user interface in at least one portion of at least one of said first and second visual representation panels; and,
at least one of any of said nestable user interfaces capable of presenting at least one background image is selectably configured to provide a recognizable indication of said at least one of any of said nestable user interfaces.

47. The computer system for presenting items to a user according to claim 46, wherein, when the first nestable user interface is in the first mode, said navigation bar provides a hierarchical list view of the tiered organizational structure.

48. The computer system for presenting items to a user according to claim 46, wherein, when the first nestable user interface is in a first state of the first mode, said first visual representation panel provides a first preview of the contents of the data associated with the fourth tier associations, said first preview arranged in accordance with said organizational structure.

49. The computer system for presenting items to a user according to claim 47, further providing, when hovering a cursor over a constituent of the navigation bar hierarchical list view, a first expanded view, within the first visual representation panel, of the visual representation of data associated with said navigation bar hierarchical list constituent.

50. The computer system for presenting items to a user according to claim 49, further providing, when pinning said expanded first view to said first visual representation panel by clicking said constituent of the navigation bar hierarchical list view, that said pinning induces said expanded first view to remain within the first visual representation panel when the cursor is no longer hovering over the constituent of the navigation bar hierarchical list view.

51. The computer system for presenting items to a user according to claim 48, wherein, when the first nestable user interface is initially in the first state of the first mode and a cursor is hovered over a first constituent of the first preview,
the first nestable user interface switches to a first mode second state that provides a first expanded detail partial preview, within a fractional portion of the first visual representation panel, of the visual representation of data associated with the first preview first constituent,
when said first preview first constituent is associated with at least one content component, said at least one content component representing at least one datum that does not represent a nestable user interface's organizational structure.

52. The computer system for presenting items to a user according to claim 51, wherein, when said cursor is initially hovering over said first constituent and the first nestable user interface is in the first mode second state,
subsequently relocating the cursor to hovering over a part of said first expanded detail partial preview effects switching the first nestable user interface to a first mode third state that provides a further expanded more complete view, within the first visual representation panel, of the visual representation of data associated with the first preview first constituent.

53. The computer system for presenting items to a user according to claim 48, wherein, when said first preview contents includes at least one second nestable user interface, the second nestable user interface is represented by a compacted representation, within the first preview, of the at least one second nestable user interface's incompacted appearance.

54. The computer system for presenting items to a user according to claim 49, wherein, when said first expanded view is a visual representation of at least one second nestable user interface, said first expanded view provides accessing capabilities to visual representations of data associated with the second nestable user interface, in its first mode, that are comparable to those provided by the first nestable user interface.

55. The computer system for presenting items to a user according to claim 46, wherein any visual representation of any said at least one second nestable user interface is denoted by at least one actable signifier that is at least one of a textual label and an image, when the visual representation of said at least one second nestable user interface is viewable within at least one of said at least one first and at least one second visual representation panels; and, when leaping into said at least one second nestable user interface by activating said actable signifier, said leaping entails the first nestable user interface assuming said second mode wherein the second visual representation panel occupies the majority of said first area and portrays said at least one second nestable user interface across its extent, and presenting a selectable option of leaping repeatedly into other nestable user interfaces, said leaping further entailing the presenting of a breadcrumb bar in a constrained portion of the first area, said breadcrumb bar providing a visual series of indicators that represent the path of nestable user interfaces traversed by said leaping to arrive at a present visual representation.

56. The computer system for presenting items to a user according to claim 46, wherein said nestable user interface is produced by utilization of a markup language.

57. The computer system for presenting items to a user according to claim 46, wherein at least one aspect of at least one of said nestable user interfaces is extensible.

58. The computer system for presenting items to a user according to claim 46, wherein at least one of said associations is at least one of local, network accessible, removable, and restrictable.

59. The computer system for presenting items to a user according to claim 46, wherein said nestable user interface functionalities are enacted by the utilization of JavaScript® routines.

60. The computer system for presenting items to a user according to claim 46, wherein the contents of the data associated with the fourth tier associations can comprise at least one of static data, dynamic data, streaming data, and applications.

\* \* \* \* \*